Figure 1:
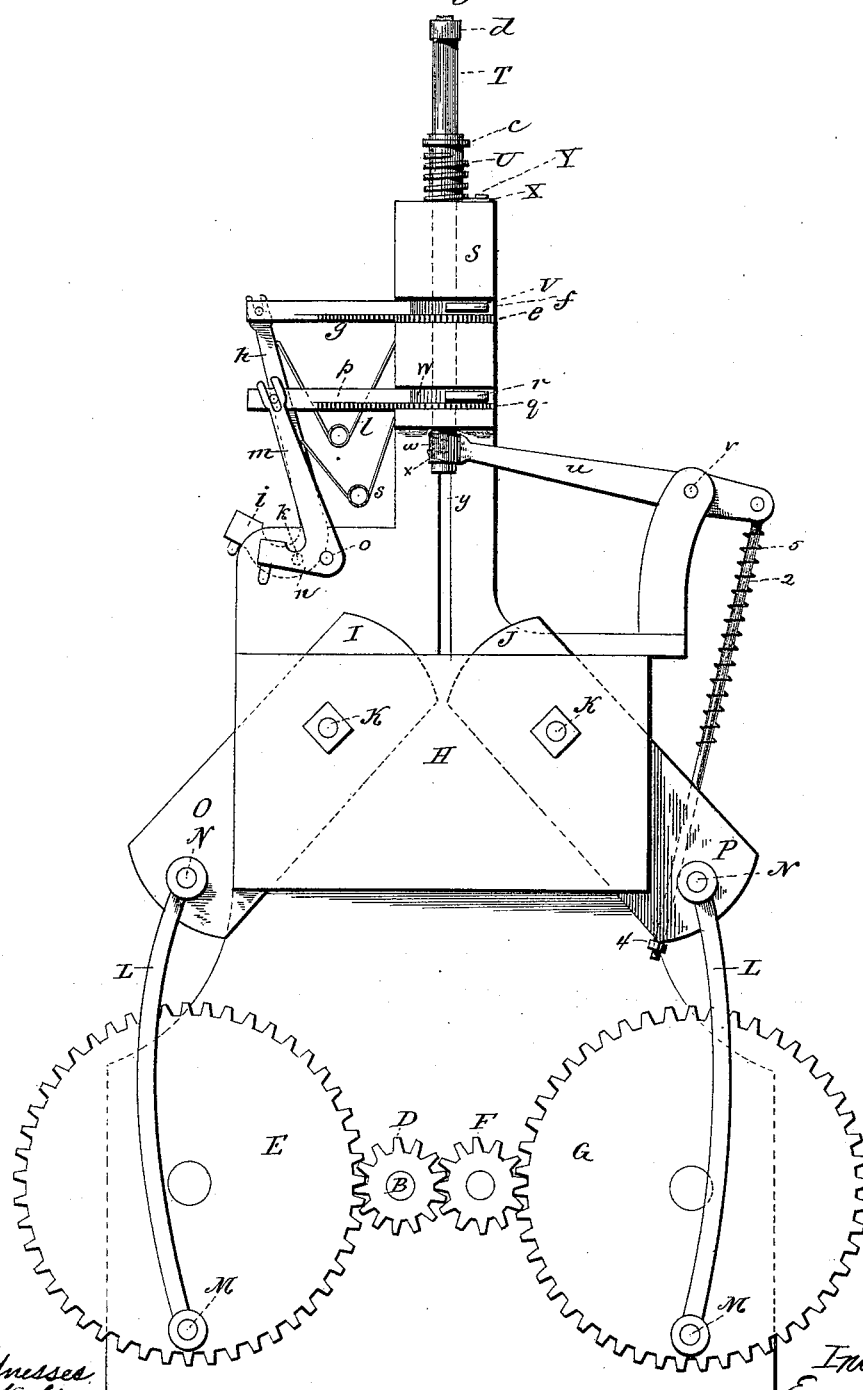

(No Model.)  3 Sheets—Sheet 1.

E. BUELL.
MACHINE FOR MAKING TOOLS FROM WIRE.

No. 463,826.  Patented Nov. 24, 1891.

Witnesses
J. H. Shumway
Lillian D. Kelsey

Inventor
Edgar Buell
By atty.
Earle Seymour

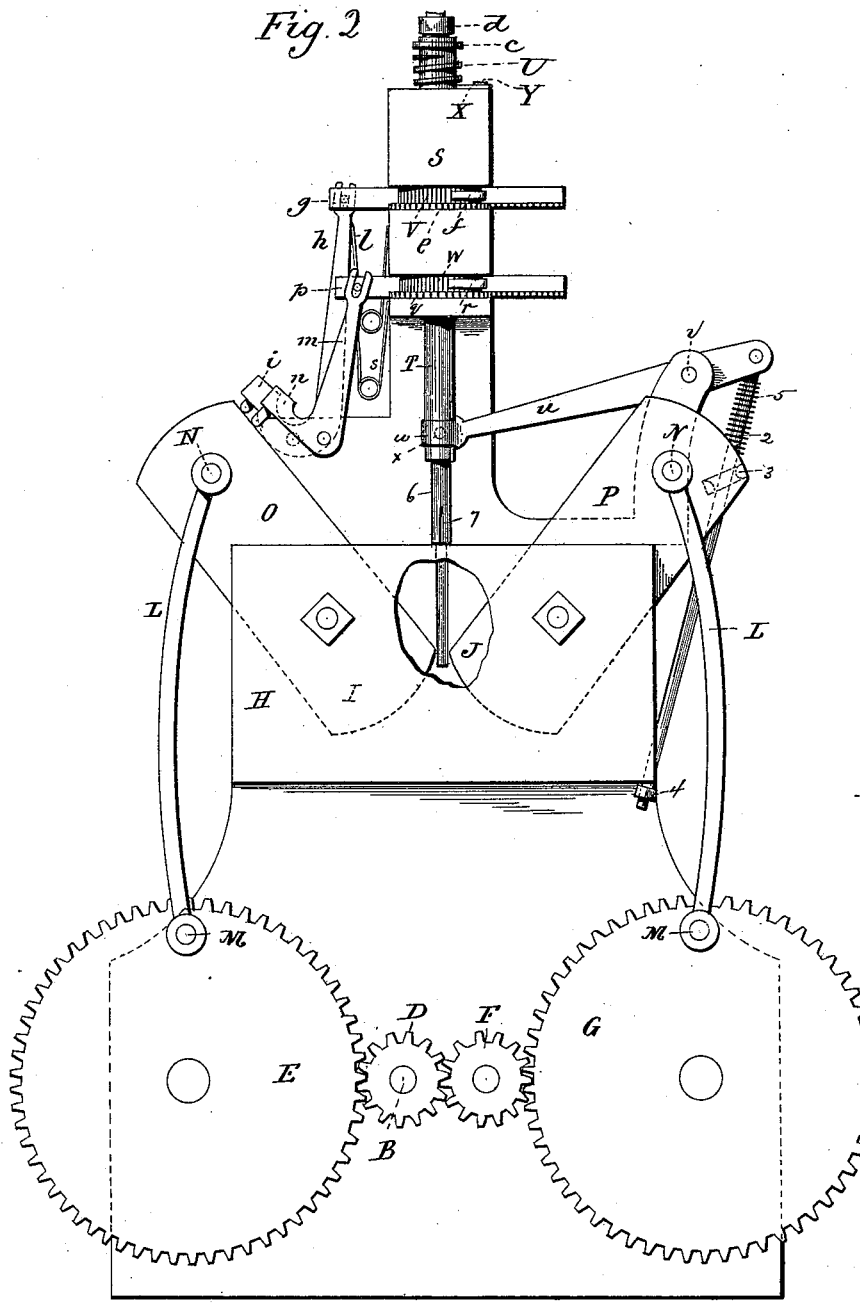

(No Model.) 3 Sheets—Sheet 3.
E. BUELL.
MACHINE FOR MAKING TOOLS FROM WIRE.
No. 463,826. Patented Nov. 24, 1891.
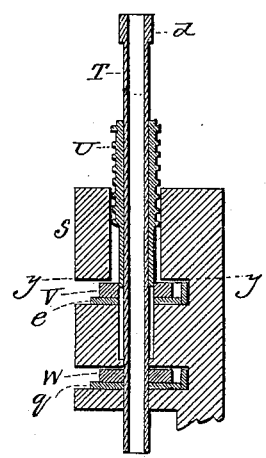
Fig. 6
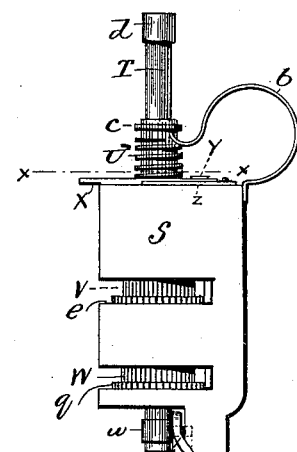
Fig. 3
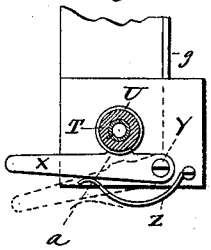
Fig. 5
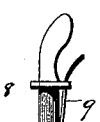
Fig. 8
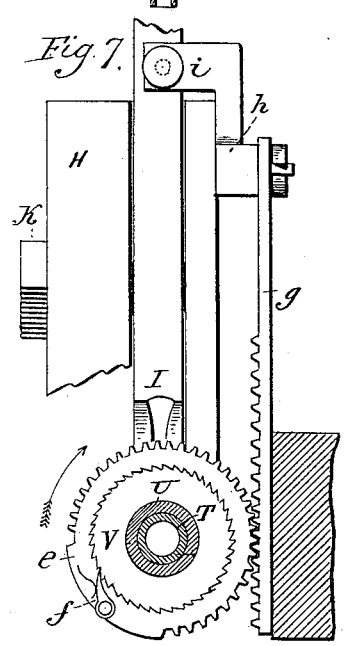
Fig. 7
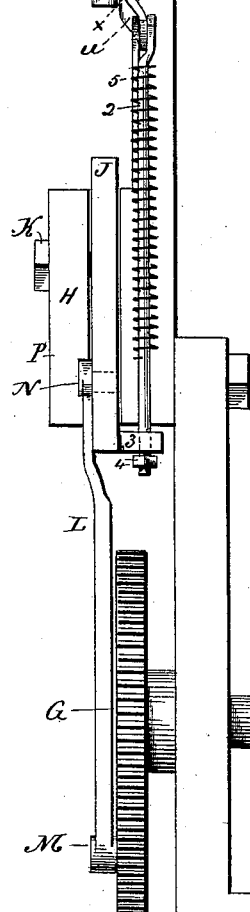
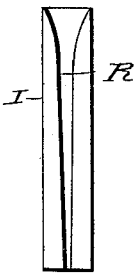
Fig. 4
Witnesses
J. H. Shumway
Lillian D. Kelsey
Inventor
Edgar Buell
by attys.
Earle Seymour

UNITED STATES PATENT OFFICE.

EDGAR BUELL, OF CLINTON, CONNECTICUT.

MACHINE FOR MAKING TOOLS FROM WIRE.

SPECIFICATION forming part of Letters Patent No. 463,826, dated November 24, 1891.

Application filed February 9, 1891. Serial No. 380,762. (No model.)

*To all whom it may concern:*

Be it known that I, EDGAR BUELL, of Clinton, in the county of Middlesex and State of Connecticut, have invented a new Improvement in Machines for Reducing Wire for the Making of Small Tools and other Purposes; and I do hereby declare the following, when taken in connection with accompanying drawings and the letters and figures of reference marked thereon, to be a full, clear, and exact description of the same, and which said drawings constitute part of this specification, and represent, in—

Figure 1 a front view with the segments in the up or returned position; Fig. 2, the same as Fig. 1, with the segments in the down or entering position; Fig. 3, a side view of the same, looking from the right of Fig. 1; Fig. 4, a face view of one of the segments; Fig. 5, a top view illustrating the means for engaging the screw-thread of the sleeve U; Fig. 6, a vertical section through the sleeve U and the spindle, illustrating the means for imparting intermittent rotation thereto; Fig. 7, a transverse section through the head-cutting on line $y\ y$ of Fig. 6, enlarged; Fig. 8, the holder detached.

This invention relates to the construction of a machine for reducing wire for various purposes, such as the forming or shaping of small tools, as awls, screw-drivers, punches, and the like, or for any similar reduction of wire, the object being to construct a machine which will operate upon the wire to reduce it in similar manner to the work of hand-forging, the machine being automatic in its operation; and the invention consists in the construction of the machine as hereinafter described, and particularly recited in the claims.

A represents the bed of the machine, on which the horizontal driving-shaft B is arranged in suitable bearings and to which revolution is imparted through a pulley C or otherwise. This shaft extends through the front, where it is provided with a pinion D, which works into a corresponding-geared crank-wheel E, so that the rotation of the shaft is communicated to the said crank-wheel, the crank-wheel revolving in a vertical plane. Upon the opposite side of the pinion D is a second correspondingly-toothed pinion F, which works into a corresponding toothed crank-wheel G, the crank-wheels E and G being alike and the gearing such as to impart to both wheels a like revolution.

To the bed of the machine an upright frame H is attached or may be made a part of the base or bed, this frame being directly over the crank-wheels E and G. On the frame H two segments I and J are arranged upon stationary studs K, which serve as axes around which the said segments may oscillate, as from the position in Fig. 1 to that seen in Fig. 2 and return. An oscillating movement is imparted to the segments I and J from the respective crank-wheels through connecting-rods L, hung to the crank-pins M of the crank-wheels, and to corresponding pins N on the arms O P of the segments, respectively, and so that as the crank-wheels revolve a corresponding vibratory movement will be imparted to the arms and segments. The faces or periphery of the segments are arranged so that when the segments are in the up position, as seen in Fig. 1, the ends of the segments will have passed so far beyond a line drawn between the said axes as to leave an open space between them at the lower end of the face of the segments, as seen in Fig. 1, and so that when in the down position, as seen in Fig. 2, there will be a similar opening between the segments; but as the segments move from one position to the other their faces will work in close contact, like a pair of rolls running in contact. In the face of each of the segments a groove R is formed, as seen in Fig. 4, the shape of these grooves combined corresponding to the shape of the reduction required for the wire or of the article to be produced. Over the segments a projecting head S is formed on the frame, through which a vertical tubular spindle T is arranged in a line between the faces of the two segments. The tubular spindle T is adapted to receive the wire-holder which carries the wire or rod to be reduced and is arranged to receive a vertical reciprocating movement.

In the head S is a tubular sleeve U, threaded upon its exterior surface and through which the spindle T passes and so as to work freely up and down therein. The sleeve U extends down into the head and is arranged so as to slide up and down therein. At its lower end it is provided with a toothed wheel V, arranged at right angles to the axis of the sleeve and so that the sleeve will work up and down through the wheel while the wheel is free for rotation, but held against vertical movement, and between the wheel V and the sleeve is a spline (not shown) or other suitable device, whereby the said sleeve, while movable up and down through the wheel, will partake of a rotation imparted to the wheel.

In the head S below the wheel V is a second similar toothed wheel W, through which the tube R passes, but so as to move freely up and down through the wheel, but engaged with the wheel for rotary movement, as described, for the wheel V and its sleeve.

The upper portion of the sleeve U is screw-threaded and projects up through and above the top of the head S. On the top of the head S a lever X is arranged upon a pivot Y and so as to swing in a horizontal plane, combined with a spring Z, the tendency of which is to force the said lever toward the screw-threaded sleeve, the lever at one point $e$ being adapted to engage the thread of the screw-sleeve, and so that when so engaged a rotary movement imparted to the sleeve through the wheel V will cause the sleeve to move up or down, according to the direction in which the rotation is produced, or when the lever is turned away from the sleeve, as represented in broken lines, Fig. 5, the sleeve will be disengaged, and so that it may be moved up or down at pleasure. A spring $b$ is arranged between the head S and the sleeve, the tendency of which is to raise the said sleeve when the sleeve is free from engagement with the lever X. As here represented, the spring engages the sleeve beneath an annular flange $c$, and so that the spring lifts upon the said flange to raise the sleeve, but yields as the sleeve descends. The spindle T is constructed with a collar $d$ above the sleeve U, and so that the spindle in its down position may come to a bearing upon the upper end of the sleeve U, as represented in Fig. 2, the said collar coming in contact with the upper end of the sleeve U limits the extent of descent of the spindle.

To impart an intermittent rotary movement to the sleeve U the wheel V is constructed as a ratchet, and below it is a toothed wheel $e$, free to revolve independent of the wheel V. The toothed wheel $e$ carries a pawl F, which is adapted to engage the teeth of the wheel V. A horizontal reciprocating rack $g$ is arranged to engage with the toothed wheel $e$ and impart an oscillating movement thereto. The reciprocating movement is imparted to the rack $g$ through a two-armed or bell-crank lever $h\,i$, hung upon a pivot $k$, and so as to swing in a plane parallel with the toothed rack $g$, one arm $h$ being engaged with the said rack, while the other arm $i$ stands in the path of the arm O of the segment I, and so that as the said arm O rises it will strike the arm $i$ and impart an intermittent movement to the rack $g$, as from the position in Fig. 1 to that seen in Fig. 2. A spring $l$ serves to return the said lever $h\,i$ and the rack $g$. As the rack $g$ is forced inward, as described, it will impart a corresponding rotation to the toothed wheel $e$ in the direction indicated by the arrow, Fig. 7. In this operation the pawl $f$ will engage the teeth of the wheel V and impart to that wheel V and the sleeve U a corresponding rotation. Then as the slide returns the wheel $e$ will return, but the pawl will escape the teeth of the wheel V and so as not to impart to the wheel V and its sleeve a return rotation. Consequently under the continued reciprocation of the rack $g$ a step-by-step or intermittent rotation will be imparted to the sleeve U, and the screw-thread of that sleeve being engaged with the lever X, such rotation will impart to the sleeve a corresponding step-by-step downward movement. The wheel W receives a similar step-by-step rotation through a two-armed or bell-crank lever $m\,n$, hung upon a pivot $o$, the arm $m$ being in connection with a reciprocating toothed rack $p$, which works into a corresponding toothed wheel $q$, which carries a similar pawl $r$ to work into the wheel W, in like manner as does the pawl $f$ into the wheel V. The arm $n$ of the lever $m\,n$ stands in the path of the arm O of the segment I in like manner, as described, for the arm $i$ of the other lever. The lever $m\,n$ is provided with a spring $s$ to give to it its return movement, the same as described for the spring $l$ of the other lever.

An up-and-down vertical movement is imparted to the spindle T independent of the sleeve U, such movement being produced through a lever $u$, hung upon a fulcrum $v$, said lever swinging in a vertical plane. One arm of the said lever engages with the lower end of the spindle T. As here represented, this engagement is produced by constructing the arm of the lever $u$ with a forked end and placing upon the lower end of the spindle T a collar $w$, which will permit the free rotation of the spindle, but yet engage the spindle, so that the spindle will move up and down with the collar. From the collar $w$ a pin $x$ projects into a vertical groove $y$ in the frame in rear of the collar, which groove and pin prevent the rotation of the collar, yet permits the up-and-down movement of the collar and spindle. The forked end of the lever $u$ embraces the pin $x$, and so that as the lever $u$ swings up and down, as from the position in Fig. 1 to that in Fig. 2 and return, a corresponding vertical reciprocating movement will be imparted to the spindle T. From the other arm of the lever $u$ a rod 2 extends down through a lug 3 on the arm P of the segment J. (See Fig. 3.) Upon the rod 2, below the lug 3, an adjustable nut 4 is applied to the rod, the rod being free in the lug and so that the lug may slide freely upon the rod. Upon the rod 2, above the lug, a spiral spring 5 is arranged, and so that as the arm P of the segment J rises it will strike the lower end of the spring 5 and through such spring tend to turn the lever $u$, so as to force the spindle T downward, as seen in Fig. 2, while on the return or descent of the arm P of the segment J the lug 3 will strike the nut 4 as the said arm P approaches its downward position and as seen in Fig. 1. The nut and spring arrangement of the rod 2 gives a considerable amount of lost motion between the arm P and the lever $u$, so that the said lever $u$ and the spindle T have a considerable freedom or independence of the swinging movement of the segments.

The holder which carries the wire or rod to be operated upon is represented detached in Fig. 8. The said holder 6 is of an external diameter corresponding substantially to the internal diameter of the spindle T and of a length preferably somewhat greater than that of the said spindle and is provided with means for engagement with the spindle, so as to partake of both the reciprocating and rotating movement of the spindle. At the lower end the holder is split, as at 7, and so that it being elastic it may be contracted or otherwise constructed, so as to be contracted to firmly grasp the wire or rod which may be passed through it. At the upper end the holder is constructed with a collar 8, adapted to rest upon the upper end of the tube T, and is also provided with a spring-latch 9, which is adapted to engage with the spindle, so as to interlock the two therewith, that the holder may partake of the movement of the spindle, as before described. This completes the construction of the machine. Its operation is as follows:

The sleeve U is adjusted to its up position, the segments I and J standing in their down position, as seen in Fig. 2, the wire or rod is introduced into the holder 6, and the holder with the rod is passed through the spindle T, the wire or rod projecting through the holder, and so that upon such introduction the lower end of the spindle will enter the space between the ends of the two segments, as seen in Fig. 2. The spindle with the holder is held in this down position by the lug on the arm in P of the segment J, bearing against the spring 5 of the rod 2, so as to turn the spindle-lever to its down position, holding it there with the yielding force of the spring 5. Now the swinging movement is imparted to the segments I J, causing them to rise, and in so doing their faces come together and engage that portion of the rod which stands between them and so as to compress it in the groove in the face of the dies, and so that that portion of the rod will assume the shape of the portion of the groove in which it stands. As the segments rise and thus grasp the rod, the upward force will cause the spindle and holder to rise with them, so long as the faces of the segments stand together; but so soon as the segments have passed so far up that the portion of the wire operated upon is free from contact with the groove in the faces of the segments, then the rod and the holder are free, and as the segments approach their extreme up position the lug 3 will strike the nut 4 on the lower end of the rod 2 and return the spindle and holder to the up position, as seen in Fig. 1, and while the holder and spindle are in this up position the segments I and J commence their return or downward movement, and as the arm N in this turning of the segments approaches its up position it will strike the arms $in$ of the feed-levers, turning those levers from the position seen in Fig. 1 to that seen in Fig. 2, and thus impart to the racks $g$ and $p$ their inward movement, the rack $g$ imparting to the sleeve U a corresponding rotation, and which rotation will cause the sleeve U to descend, according to the pitch of its screw-thread, while the other rack $p$ will have imparted a partial rotation to the spindle T with the holder and rod which it carries. The descent of the spindle is arrested by the collar $d$ at its upper end coming against the upper end of the sleeve U, so that as the second descent of the spindle is made it will drop as much farther than in the first operation, as the sleeve U has descended, and a corresponding additional projection of the wire or rod between the segments will have been produced, so that on the second operation additional metal will be presented for the operation of the segments, and also the rod will be presented in a different position circumferentially, owing to the rotation which has been imparted to the spindle T, and so continuing each operation will introduce the rod to a greater extent between the two segments and the rotative movement will present that metal in a new position circumferentially at each operation. The segments continue their vibration and the descent and rotation of the rod or wire continues until the required result is attained— that is, until the required reduction is made or the article to be produced is properly shaped. The representation of the shape in Fig. 4 is that required for an awl or punch, and is sufficient to illustrate the operation of the invention. When one reduction or article has been completed, it is cut from the rod and the rod re-presented for a second reduction or formation of the second article. The upward movement of the segments is preferably made so far as to entirely separate them in their up position, as seen in Fig. 1, in order that the grip of the segments upon the wire or rod may be entirely released, so that the ascent of the rod for a new feed is insured under all circumstances, and so that, if desired, the segments may operate upon the rod until it projects or extends below the lower face—as, for illustration, if it be desired to simply reduce a rod of equal transverse area and of unlimited length the downward feed and rotation would continue until the required length is attained. The segments opening in their extreme upward movement will permit the rise of the rod for a new feed, notwithstading the fact that the portion previously operated upon extended far below the lower end of the segments.

By introducing the rod between the entrance ends of the segments while those ends are open, the said entrance ends of the segments being upon that side of the segments toward which they are to swing in operation and so as to grasp but a small portion of the rod at the first operation, the extent of surface grasped increasing at each operation, the reduction is produced in a similar manner to that of a smith in hand-forging, and whereby the liability of splitting the metal, which necessarily follows the reduction of the wire or rod when introduced between the working surfaces from the side opposite that toward which the segments are moving, is avoided.

In the illustration the dies are represented as for making a reduction round in transverse section. It may be desirable to reduce the rod in angular shape, as square in transverse section. In such case the grooves in the face of the segments will be made accordingly and the rotative movement imparted to the spindle will be made to correspond to the shape of the reduction required, so that the angle will be properly presented between the segments. The segments, operating as I have described for the introduction of the rod to be reduced between the open segments and on that side of the segments toward which they advance for operation, may be employed with various kinds of intermittent advancing feed well known in the art, or the presentation of the rod and feed may be made by hand, the operator presenting the rod and rotating it, as described, for the automatic apparatus. I therefore do not wish to be understood as limiting the invention to the necessary employment of an automatic feed, or to the particular construction of the intermittent automatic advance and rotative feed which I have described.

I claim—

1. In a machine for reducing wire or rods, the combination of two segments hung upon axes concentric with the face of the segments and so as to vibrate in planes at right angles to their axes, and so that in vibrating the faces of said segments will run in close contact with each other, the said segments constructed to swing so far beyond the line between the axes on which they vibrate as to form an open space between the two ends of the segments then nearest to each other, the faces of the said segments constructed with corresponding cavities starting from the said two ends and extending around the faces of the segments, the said cavities corresponding in shape to the reduction required, mechanism substantially such as described for imparting such vibratory movement to such segments, and mechanism substantially such as described to introduce the wire to be reduced between the said open ends of the segments and on that side of the segments from which the said segments moved in such opening movement, substantially as described, and whereby the segments will operate upon the wire in their return movement toward the wire.

2. In a machine for reducing wire or rods, the combination of the two segments I J, hung upon axes K and so that said segments will swing in planes at right angles to said axes, the faces of the said segments adapted to work in close contact in such vibration, mechanism substantially such as described to impart vibratory movement to the said segments, but the said segments adapted in their vibratory movement to swing so far beyond a line between the axes on which they vibrate as to separate the segments and leave a space between the entrance ends of the segments, the segments constructed with cavities starting from said entrance ends and extending around the face of the segments, the said cavities corresponding in shape to the reduction required, a tubular holder adapted to receive and hold the wire or rod to be reduced, with mechanism substantially such as described on that side of the segments toward which they vibrate in operation to impart reciprocating movement to said holder, substantially as specified.

3. In a machine for reducing wire or rods, the combination of the segments I J, hung upon axes and so as to vibrate thereon, the segments constructed with cavities in their faces corresponding to the shape of the reduction to be made, mechanism substantially such as described to impart vibratory movement to said segments, a tubular sleeve U, arranged in a line with the cavities between the said segments, a tubular spindle T, arranged through said sleeve, a tubular holder adapted to carry the wire or rod and arranged in said tubular spindle, mechanism substantially such as described to impart intermittent rotary and advance movement to said sleeve, and mechanism substantially such as described to impart reciprocating and rotative movement to said spindle, substantially as and for the purpose described.

4. In a machine for reducing wire or rods, the combination of the vibrating segments I J, having cavities in their faces corresponding to the reduction required, mechanism substantially such as described to impart vibratory movement to said segments, screw-threaded tubular sleeve U, toothed wheel $e$, a ratchet V, through which the said sleeve is movable vertically, but engaged therewith rotatively, the lever X, adapted to engage or disengage the thread of the said sleeve U, tubular spindle T through said sleeve U, and constructed with a shoulder $d$ as a stop against the upper end of said sleeve, a toothed wheel $q$ and ratchet W, through which the said spindle moves vertically, but adapted to engage therewith rotatively, the sliding racks $g$ $p$, arranged to engage, respectively, the toothed wheels $e$ and $q$, the bell-crank lever $i\,h$, one arm $h$ arranged to engage with the said rack $g$, a second bell-crank lever $m\,n$, the one arm $m$ arranged to engage the rack $p$, the other arms $i\,n$ of the said levers standing in the path of the arm of one of the segments with a lever $u$ arranged to swing in a vertical plane, one arm adapted to engage the said spindle to impart vertical reciprocating movement thereto, a rod 2, hung to the other arm of said lever $u$ and extending through a lug 3 on the arm of one of the segments, a spring 5 on said rod above said lug, and a nut on the rod below said lug, all substantially as and for the purpose described.

In testimony whereof I have signed this specification in the presence of two subscribing witnesses.

EDGAR BUELL.

Witnesses:
EZRA E. POST,
WALTER M. STANNARD.